United States Patent [19]

Deichert et al.

[11] 4,355,147

[45] Oct. 19, 1982

[54] POLYSILOXANE WITH POLYCYCLIC MODIFIER COMPOSITION AND BIOMEDICAL DEVICES

[75] Inventors: William G. Deichert, Macedon; Gary D. Friends, Ontario; John B. Melpolder, Hilton; Joon S. Park, Rochester, all of N.Y.

[73] Assignee: Bausch & Lomb Incorporated, Rochester, N.Y.

[21] Appl. No.: 238,524

[22] Filed: Feb. 26, 1981

[51] Int. Cl.$^3$ .................. C08F 220/12; C08F 226/06
[52] U.S. Cl. .......................... 526/264; 128/DIG. 21; 204/159.13; 351/160 H; 526/263; 526/279; 528/24; 528/26; 528/29
[58] Field of Search .......................... 528/26, 29, 24; 526/264, 263, 279; 204/159.13

[56] References Cited

U.S. PATENT DOCUMENTS

| | | | |
|---|---|---|---|
| 3,639,362 | 2/1972 | Duling et al. | 260/78.5 |
| 3,808,178 | 4/1974 | Gaylord | 260/86.1 E |
| 4,152,508 | 5/1979 | Ellis et al. | 526/279 |
| 4,153,641 | 5/1979 | Deichert et al. | 526/279 |
| 4,208,506 | 6/1980 | Deichert et al. | 528/32 |
| 4,228,269 | 10/1980 | Loshaek et al. | 526/346 |
| 4,276,402 | 6/1981 | Chromecek et al. | 528/26 |

FOREIGN PATENT DOCUMENTS

2036765 7/1980 United Kingdom .

*Primary Examiner*—Wilbert J. Briggs, Sr.
*Attorney, Agent, or Firm*—Robert M. Phipps

[57] ABSTRACT

Monomeric polysiloxanes endcapped with activated unsaturated groups are copolymerized with polycyclic modulus modifiers and tear film stabilizers to form hard, gas permeable, polysiloxane contact lenses and other biomedical devices.

17 Claims, No Drawings

POLYSILOXANE WITH POLYCYCLIC MODIFIER COMPOSITION AND BIOMEDICAL DEVICES

BACKGROUND OF THE INVENTION

1. Field of the Invention

This invention relates to hard, gas permeable, biomedical devices including contact lenses prepared from monomeric polysiloxanes polymerized with a polycyclic modulus modifier and a tear film stabilizer.

2. Prior Art Statement

U.S. Pat. No. 3,639,362 discloses optical lenses with high glass transition points made from copolymers of (a) adamantane acrylate or methacrylate and (b) a second polymerizable, unsaturated monomer such as methylmethacrylate, styrene, acrylonitrile or vinyl chloride.

U.S. Pat. No. 3,808,178 discloses contact lenses fabricated from a copolymer of a polysiloxanylalkyl acrylic ester and an alkyl acrylic ester. The copolymer is said to have increased oxygen permeability. Wettability can be imparted to the copolymer by the addition of about 0.1 to about 10 percent by weight of the one or more hydrophilic monomers such as hydroxyalkyl acrylates and methacrylates, acrylic and methacrylic acid, acrylamide, glycidyl acrylate and N-vinyl pyrrolidinone.

U.S. Pat. No. 4,152,508 discloses hard contact lenses having a high oxygen permeability. The lens material is a copolymer of a siloxanylalkyl ester monomer, and itaconate ester and an ester of acrylic or methacrylic acid. Representatives of itaconate esters include phenyl itaconate, diphenyl itaconate and methyl phenyl itaconate.

U.S. Pat. No. 4,153,641 discloses contact lenses made from polymers and copolymers comprising poly(organo-siloxane) polymers and copolymers formed by polymerizing a poly(organosiloxane) monomer $\alpha,\omega$ terminally bonded through divalent hydrocarbon groups to polymerized, free radical polymerizably activated, unsaturated groups forming a polymer in a cross-linked network. Additionally, specific comonomers are disclosed which include lower esters of acrylic and methacrylic acid, styryls and N-vinyl pyrrolidinone which may be copolymerized with the above described poly(organosiloxane) to form a copolymer. The instant invention preferred polysiloxane monomers include the same poly(organosiloxane) monomers described above.

U.S. Pat. No. 4,208,506 discloses soft contact lenses made from polymers and copolymers comprising polyparaffinsiloxane polymers and copolymers formed by polymerizing a polyparaffinsiloxane monomer $\alpha,\omega$ terminally bonded through divalent hydrocarbon groups to polymerized, free radical polymerizably activated, unsaturated groups forming a polymer in a cross-linked network. Additionally, specific comonomers are disclosed which include lower esters of acrylic and methacrylic acid, styryls and N-vinyl pyrrolidinone which may be copolymerized with the above described polyparaffinsiloxane monomer to form a copolymer. The instant invention preferred polysiloxane monomers include the same polyparaffinsiloxane monomers described above.

U.S. Pat. No. 4,228,269 discloses contact lenses and blanks for same are made by polymerizing at least one styrene type monomer, optionally with at least one crosslinking monomer and optionally with other monoolefinically unsaturated monomers. Preferably the styrene monomer is a styrene substituted in the ring by at least one alkyl group, e.g., tertiary-butyl styrene and/or isopropyl styrene. The lenses have high gas permeability.

U.S. Pat. No. 4,254,248, granted on application Ser. No. 074,922 by Gary D. Friends et al., discloses monomeric polysiloxanes endcapped with activated unsaturated groups polymerized with a comonomer comprising a polycyclic ester of acrylic acid or methacrylic acid to form a soft contact lens is disclosed. The polycyclic monomer is present in an amount from about 20 to 80 weight percent of the total polymer. These instant polysiloxane copolymer soft contact lenses have unexpectedly high tear strengths and unexpectedly high modulus of elasticity.

U.S. Pat. No. 4,276,402, granted on application Ser. No. 075,365 by Richard E. Chromecek et al., discloses monomeric polysiloxanes endcapped with activated unsaturated groups polymerized with acrylic acid and polycyclic ester of acrylic acid or methacrylic acid to form a soft contact lens. The polycyclic monomer is present in an amount from about 5 to 50 weight percent of the total polymer and the acrylic acid is present in an amount from 1 to about 30 weight percent. These terpolymer soft contact lenses have unexpectedly high tensile strengths and improved tear strengths as compared to copolymers of polysiloxane and acrylic acid.

U.K. patent application No. 2,036,765 discloses soft contact lenses comprised of a hydrated copolymer of a major proportion of an hydroxyalkyl acrylate or methacrylate, up to 12% by weight of any ethylinically unsaturated acid or anhydride, a major proportion of a crosslinking monomer and a minor proportion of styrene or substituted styrene, the free acid or anhydride groups being in bulk form. The reinforcing effect of the styrene in the copolymer can be increased by incorporating it in more concentrated sequence, e.g., as a block copolymer.

SUMMARY OF THE INVENTION

In accordance with this invention, biomedical devices, including optical contact lenses, are provided which are made from three-dimensional network polymerizates of (1) polysiloxanes $\alpha,\omega$ terminally bonded through a divalent hydrocarbon group to an activated, unsaturated group, (2) a polycyclic modulus modifier and (3) a tear film stabilizer.

The present invention provides materials which can be usefully employed for the fabrication of prostheses such as heart valves and intraocular lenses, optical contact lenses or films. More particularly, the instant invention concerns hard contact lenses.

DESCRIPTION OF THE PREFERRED EMBODIMENTS

The monomers employed in accordance with this invention are readily polymerized to form three-dimensional polymeric networks which permit the transport of oxygen and are optically clear, strong and hard.

The preferred polysiloxanes employed are (I) poly(organosiloxanes) of the formula

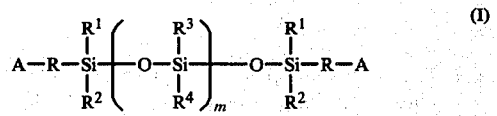

or (II) polyparaffinsiloxanes of the formula

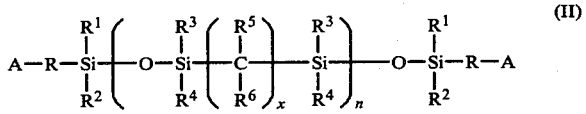
(II)

wherein A is an activated unsaturated group; R is a divalent hydrocarbon radical having from 1 to about 22 carbon atoms, $R^1$, $R^2$, $R^3$ and $R^4$ are each independently selected from the group consisting of a monovalent hydrocarbon radical having from 1 to about 12 carbon atoms and a halogen substituted monovalent hydrocarbon radical having from 1 to about 12 carbon atoms; $R^5$ and $R^6$ can be the same or different and are selected from the group consisting of hydrogen, a hydrocarbon radical containing from 1 to about 12 carbon atoms, a carboxylic acid group, a carboxylic acid ester group represented by the formula —C(O)OR$^7$ wherein $R^7$ is selected from the group consisting of a hydrocarbon group containing from 1 to about 12 carbon atoms and a carboxylic acid amide represented by the formula —C(O)NR$^8$R$^9$ wherein $R^8$ and $R^9$ can be the same or different and each is selected from the group consisting of hydrogen and a hydrocarbon group containing from 1 to about 12 carbon atoms; x is from 2 to 25, m is an integer from 0 to 100 and n is an integer from 1 to 100. Desirably m will be from 0 to 50 and preferably from 0 to 25. Desirably n will be from 1 to 50 and preferably from 1 to 25. Desirably x will be from 2 to 10 and more preferably is 2 or 3.

The term "an activated unsaturated group" refers to a group which has a substituent which functions through resonance to increase the free radical stability or activity of the double bond, thereby facilitating free radical polymerization of the monomer. These activated unsaturated groups become polymerized to form a polymer with a crosslinked three-dimensional network. Preferably the activating groups present are such that the monomers lend themselves to polymerization under mild conditions, such as ambient temperatures. Preferred activating groups include:

| | |
|---|---|
| 2-cyanocryloxy | CH$_2$=C(C≡N)C(O)O— |
| acrylonitryl | CH$_2$=C(C≡N)— |
| acrylamido | CH$_2$=CHC(O)NH— |
| acryloxy | CH$_2$=CHC(O)O— |
| methacryloxy | CH$_2$=C(CH$_3$)C(O)O— |
| styryl | CH$_2$=CHC$_6$H$_4$— |

N-vinyl-2-pyrrolidinone-x-yl wherein x may be 3, 4, or 5

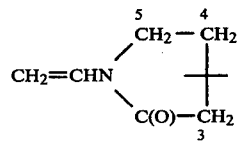

The more preferred polysiloxane is the poly(organosiloxane) of formula I above. In the preferred embodiment A is acryloxy or methacryloxy and more preferably methacryloxy.

R is preferably an alkylene radical. Therefore, preferably R is methylene, propylene, butylene, pentamethylene, hexamethylene, octamethylene, dodecylmethylene, hexadecylmethylene and octadecylmethylene. However, R can also be an arylene radical such as phenylene or biphenylene. More preferably R is an alkylene radical having 1,3 or 4 carbon atoms. Most preferably R is an alkylene radical having from about 3 to 4 carbon atoms, e.g., butylene.

Preferably, $R^1$, $R^2$, $R^3$ and $R^4$ are alkyl radicals having from 1 to 12 carbon atoms, e.g., methyl, ethyl, propyl, butyl, octyl, dodecyl and the like; cycloalkyl radicals, e.g., cyclopentyl, cyclohexyl, cycloheptyl and the like; mononuclear and binuclear aryl radicals, e.g., benzyl, phenylethyl, phenylpropyl, phenylbutyl and the like; alkaryl radicals, e.g., tolyl, xylyl, ethylphenyl and the like; haloaryl radicals such as chlorophenyl, tetrachlorophenyl, difluorophenyl and the like; halo substituted lower alkyl radicals having up to about four alkyl carbon atoms such as fluoromethyl and fluoropropyl. More preferably $R^1$, $R^2$, $R^3$ and $R^4$ are methyl radicals and phenyl radicals, most preferably each substituent is methyl.

Preferably $R^5$ and $R^6$ are selected from the group consisting of hydrogen, hydrocarbon containing from 1 to about 6 carbon atoms and a carboxylic acid group. More preferably $R^5$ and $R^6$ are selected from the group consisting of hydrogen and methyl.

Preferably $R^7$ is a hydrocarbon group containing from 1 to about 6 carbon atoms and most preferably is methyl.

Preferably $R^8$ and $R^9$ are each selected from the group consisting of hydrogen and hydrocarbon containing from 1 to about 4 carbon atoms. Most preferably $R^8$ and $R^9$ are each selected from the group consisting of hydrogen and methyl.

The polyparaffinsiloxane monomers employed in this invention are prepared according to the method disclosed in U.S. Pat. No. 4,208,506 granted June 17, 1980.

The method of preparation of the poly(organosiloxane monomers is disclosed in U.S. Pat. No. 4,153,641 granted May 8, 1979.

The second component of the polymer of this invention is a strength member which improves the modulus property of the polysiloxane with a minimum reduction of the oxygen permeability property. The polymers of this invention have a flexural modulus of at least 1,500 kg/cm$^2$. For convenience, this function can be referred to as a modulus modifier. The modifier is a polycyclic acrylate or methacrylate selected from the group of isobornyl acrylate, isobornyl methacrylate, dicyclopentadienyl acrylate, dicyclopentadienyl methacrylate adamantyl acrylate, adamantyl methacrylate, isopinocamphyl acrylate and isopinocamphyl methacrylate. The modifier is present in an amount from 90 to 30 parts by weight per 10 to 70 parts by weight of the above described polysiloxane monomers. In each event, the total parts of modifier and polysiloxane present are 100 parts. More preferably the modifier is present in the amount of 90 to 40 parts, more preferably yet the modifier is 70 to 40 parts.

The relative hardness (or softness) of the contact lenses, i.e., polymer of this invention can be varied by the amount of modulus modifier employed. Further small changes in the relative hardness can be obtained by decreasing or increasing the molecular weight of the monomeric polysiloxane endcapped with the activated, unsaturated groups. As the ratio of siloxane units to endcap units increases, the softness of the material increases. Conversely, as this ratio decreases, the rigidity and hardness of the material increases.

The third component of the polymeric composition of this invention is the tear film stabilizer hydrophilic monomer. The stabilizer is present in an amount of 2 to 20 parts by weight for each 100 parts of polysiloxane and modulus modifier. More preferably, the stabilizer will be employed in the amount of 3 to 12 parts. Most preferably the stabilizer will be present in an amount of 5 to 9 parts.

The tear film stabilizer is selected from the group consisting of hydroxypropyl acrylate, hydroxyethyl acrylate, hydroxyethyl methacrylate, hydroxypropyl methacrylate and mixtures thereof. Of the foregoing stabilizers, hydroxyethyl methacrylate is the most preferred.

While not wishing to be bound by any particular rationale, it appears that contact lenses on introduction to the eye tend to alter the layers of material of the tear film and inhibit the formation of a film over the contact lens. It is believed that the incorporation of a tear film stabilizer into the polymer matrix permanently reduces or avoids the film formation problem and allows tear fluid to coat the contact lenses. The prior art has sought to achieve this effect, in part, by the use of hydrophilic coatings on the lenses but the coatings are subject to removal on repeated handling of the lenses.

Optionally, the above three-component polymer system can contain from zero to 20 parts by weight, based on weight of polysiloxane and modulus modifier, of an auxiliary modifier. These auxiliary modifiers are reactive with the three components of this invention. Minor but often desirable changes of physical properties, e.g., tear strength and tensile strength, are obtained by the use of auxiliary modifiers.

Useful auxiliary modifiers include, but are not limited to, tertiary-butyl acrylate, polyethylene glycol acrylate, polyethylene glycol diacrylate, polyethylene glycol methacrylate, polyethylene glycol dimethacrylate, divinyl benzene, neopentylglycol diacrylate, neopentylglycol dimethacrylate, polyvinyl alkyl benzenes, especially divinyl alkyl benzenes, e.g., divinyl toluene, 1,3-bis(4-methacryloxybutyl) tetramethyl disiloxane and mixtures thereof. The foregoing polyethylene glycols will contain from 2 to 9 repeating ethylene glycol units.

The polysiloxanes $\alpha,\omega$ terminally bonded through a divalent hydrocarbon group to an activated unsaturated group, i.e., the monomers herein, are generally clear, colorless liquids whose viscosity depends on the value of m or n. These monomers can be readily cured to cast shapes by conventional methods such as free radical initiators. Illustrative of free radical initiators which can be employed are bis(isopropyl) peroxydicarbonate, azobisisobutyronitrile, acetyl peroxide, lauroyl peroxide, decanoyl peroxide, benzoyl peroxide, benzoin methyl ether, diethoxyacetophenone, tertiarybutyl peroxypivalate and the like.

When the term monomer is used, it is meant to include polysiloxanes endcappd with polymerizable unsaturated groups. The process of lengthening the siloxane portion of the monomer is referred to herein as siloxane ring insertion. The chain length of the polysiloxane center unit of the monomers may be as high as 100.

The term polymerization is used to refer to the polymerization of the polysiloxanes endcapped with polymerizable activated unsaturated groups which results in a crosslinked three-dimensional polymeric network.

"A polysiloxane terminally bonded through a divalent hydrocarbon group to an activated, unsaturated group" means the described polysiloxane compound has been attached to a divalent hydrocarbon group, such as methylene or propylene, and then at the end of this group is attached an activated, unsaturated group and this then is the most preferred siloxane monomer. Then when these monomers are polymerized (free radical polymerization) with other activated unsaturated monomers, three-dimensional polymer networks are obtained. This polymerized material is what the biomedical devices, including contact lenses, are made.

The advantages of using the contact lenses, i.e., polymers of the instant invention which are made from the monomers disclosed herein are numerous. For example, (1) the advantages of using activated vinyl terminal groups to cure the siloxane material are (a) the high reactivity systems permit rapid cure at or near room temperature if suitable initiators are used, (b) no fillers are needed to get useful physical strength as is common with most silicone resins in contact lenses. This is desirable since the use of fillers requires that other possibly undesirable materials be added to the composition in order to match the refractive index of the polymer to the filler.

Secondly, the contact lenses made from the polymer of the instant invention are oyxgen permeable. A critical oxygen tension and flux under a lens should be about 10 mmHg and 2 ml/(cm$^2$ hr.) respectively below which corneal swelling occurs, Polse and Decker, *Investigative Ophthalmology and Visual Science*, vol. 18, p 188, 1979. In order to meet these requirements the lens material must have adequate oxygen permeability. When m in formula I and n in II above are at least about 4, the chain of siloxane is long enough in the instant composition to exceed the oxygen requirements of the cornea. However, in specific situations m and n may be as low as 0.

Additionally, these lenses are hydrolytically stable meaning that when the contact lenses are placed into an aqueous solution, e.g., on the eye, or during the disinfecting step, i.e., water plus heat, the lenses will not change in chemical composition, i.e., hydrolyze.

The most preferred contact lens of the instant invention is a fillerless, oxygen permeable, hydrolytically stable, biologically inert, transparent, hard, polymeric contact lens comprising a poly(organosiloxane) terminally bonded through a divalent hydrocarbon group to a polymerized activated, unsaturated group. These most preferred contact lenses have an oxygen permeability of at least $10 \times 10^{-11}$ cm$^3$ cm/(sec.cm$^2$ mmHg), are hydrolytically stable, biologically inert and transparent.

The polymers of this invention can be formed into contact lenses by the spincasting process as disclosed in U.S. Pat. Nos. 3,408,429 and 3,496,254 and other conventional methods such as compression molding as disclosed in U.S. Pat. Nos. 4,085,459 and 4,197,266.

The polymers can be used to modify collagen to make blood vessels, urinary bladders and other such devices as disclosed in Kliment, U.S. Pat. No. 3,563,925. The instant polymers can be used to make catheters as disclosed in Shephard U.S. Pat. No. 3,566,874. The polymers can also be used as semipermeable sheets for dialysis, artificial dentures and all of such disclosures as set forth in Stoy, U.S. Pat. No. 3,607,848. Additionally, the polymers can be used in making breathable leather and other materials as disclosed in Shephard, U.S. Pat. No. 3,660,218. The instant polymers can be used in ophthalmic prostheses and all other uses disclosed in Wichterle, U.S. Pat. No. 3,679,504. The foregoing polymers can be used in making printing plates and for other similar type uses as disclosed in Takaishi, U.S. Pat. No. 3,733,200.

When the terms "shaped article for use in biomedical applications" or "biomedical device" are used herein, it is meant that the materials disclosed herein above physiochemical properties rendering them suitable for prolonged contact with living tissue, blood and the mucous membrane. These properties are required for biomedical shaped articles, such as surgical implants, blood dialysis devices, blood vessels, artificial ureters, artificial breast tissue and membranes intended to come in contact with body fluid outside of the body, e.g., membranes for kidney dialysis and heart/lung machines and the like. It is known that blood, for example, is rapidly damaged in contact with artificial surfaces. The design of a synthetic surface which is antithrombogenic and nonhemolytic to blood is necessary for prostheses and devices used with blood. The instant polymers are compatible with living tissue.

The polymers disclosed herein can be boiled and/or autoclaved in water without being damaged whereby sterilization may be achieved. Thus, an article formed from the disclosed polymers may be used in surgery where an article compatible with living tissue or with the mucous membrane may be used.

The following examples are illustrative only and should not be construed as limiting the invention. All parts and percents referred to herein are on a weight basis and all viscosities measured at 25° C. unless otherwise specified.

EXAMPLE I

To a three-neck reaction vessel equipped with a mechanical stirrer and calcium sulfate drying tube is charged 810.1 parts of octamethylcyclotetrasiloxane, 182.8 parts of 1,3-bis(4-methacryloxybutyl) tetra methyl disiloxane and 2.5 parts of trifluoromethane sulfonic acid. The reaction proceeds at room temperature. After a reaction time of three hours, the catalyst is neutralized with a 10 fold excess (13.9 parts) of sodium bicarbonate. Stirring is continued for about three hours to insure complete neutralization. The crude reaction product is filtered through a column packed with Celite ® brand diatomaceous earth and activated alumnia (Alcoa F20 grade). The resulting filtrate is freed of volatiles by passing it over a thin film evaporator operating at 110° C. temperature and 0.25 torr pressure. The final prepolymer product has a viscosity of 0.28±0.05 stokes and approximately 25 dimethylsiloxy repeating units.

EXAMPLE II

Example I is repeated except that 890.4 parts of octamethylcyclotetrasiloxane and 100.6 parts of 1,3-bis(4-methacryloxybutyl) tetramethyl disiloxane are used. The resulting prepolymer resin has approximately 50 dimethylsiloxy repeating units.

EXAMPLE III

A casting solution is prepared by mixing together 65 parts of a polymer having approximately 20 dimethylsiloxy repeating units similar to that of Example II, 35 parts of isobornyl acrylate, 18 parts of hydroxypropylacrylate and one part of diethoxyacetophenone catalyst. The solution is cast between glass plates. The solution is then cured by ultraviolet radiation for two hours. A clear film is obtained. Physical test values obtained on the film are as follows:

| | |
|---|---|
| Tensile Strength, Ultimate | 1,320 g/mm$^2$ |
| Tangent Modulus of Elasticity | 63,460 g/mm$^2$ |
| Elongation, Ultimate | 35% |
| Oxygen Permeability-Approx. | 10$^{-11}$cm$^3$cm/(sec. cm$^2$mmHg) |

EXAMPLE IV

A solution containing 40 parts of isobornylmethacrylate (hereinafter referred to as IBOMA), 60 parts of the prepolymer resin of Example I, 9 parts of hydroxyethylmethacrylate (hereinafter referred to as HEMA), 1 part of tertiary-butyl peroctoate and 2 parts of sec. butyl peroctoate is cast into a film (approximately 3.2 mm thick) between glass plates. The casting is maintained at 60° C. for one-half hour and then at 100° C. for one hour to obtain a film. The film is removed from between the plates and then devolatilized for 15 minutes at 80° C. Physical test values obtained on the film are as follows:

| | |
|---|---|
| Flexural Strength | 125 Kg/cm$^2$ |
| Flexural Modulus | 3,314 Kg/cm$^2$ |
| Barcol Hardness | 25 |
| Impact Strength (ASTM D-256) (Notched IZOD) | 80.10 Joules/ meter (J/m) |
| Oxygen permeability | 10.6 × PHEMA |
| Deflection (ASTM D-790) | 12.2mm |

A typical oxygen permeability value for PHEMA (polyhydroxyethylmethacrylate) hydrogel is $8.0 \times 10^{-11}$ cm$^3$ cm/(sec. cm$^2$ mmHg). The oxygen permeability measurements were made using a flat polarographic sensor. The method used was basically that described by Refojo et al (Refojo, M., Holly, F., and Leong, F-L., *Contact and Intraocular Lens Medical Journal*, vol. 3, issue 4, p 27 (1977). The values have been corrected for sample thickness.

EXAMPLE V

A composition similar to that of Example IV is cast as a rod by filling a vial 2 cm in diameter and 5 cm in height and curing overnight in a water bath at 40° C. followed by post curing in an air oven at 80° C. for 0.5 hours followed by 0.5 hours at 100° C. The resultant optically clear rod is lathe cut into buttons from which hard contact lenses are fabricated.

EXAMPLE VI

Following the procedure of Examples I and IV, additional polymers are prepared and tested. These results are summarized in Table I below. The polymers are clear and suitable for optical use.

TABLE I

| | POLYMER | |
|---|---|---|
| | A | B |
| Composition | | |
| Parts Prepolymer of Example I | 50 | 40 |
| Parts IBOMA | 50 | 60 |
| Parts HEMA | 9 | 9 |
| Flexural Strength, Kg/cm$^2$ | 257 | 444 |
| Flexural Modulus, Kg/cm$^2$ | 7,157 | 11,729 |
| Barcol Hardness | 46 | 60 |
| Impact Strength (ASTM D256) J/m | 79.03 | 46.46 |
| Oxygen Permeability × PHEMA | 6.3 | 3.1 |

TABLE I-continued

| | POLYMER | |
|---|---|---|
| | A | B |
| Deflection (ASTM D790) mm | 9.3 | 9.3 |

EXAMPLE VII

A copolymer is prepared by making a solution of 20 parts of the prepolymer of Example I, 40 parts of the prepolymer of Example II, 40 parts of isopinocamphyl arylate, 6 parts of hydroxyethylacrylate and 3 parts of benzoyl peroxide and then cured to obtain a clear, hard polymer for optical purposes.

EXAMPLE VIII

Following the procedure of Examples I and IV, additional polymers are prepared and tested except that the siloxane monomer has approximately 15 dimethylsiloxy repeating units. The polymers are clear and suitable for hard contact lenses. Physical test values and polymer compositions are summarized in Table II below.

TABLE II

| | POLYMER | | |
|---|---|---|---|
| | A | B | C |
| Composition | | | |
| Siloxane Monomer, Parts | 74 | 63 | 58 |
| IBOMA, Parts | 26 | 37 | 42 |
| HEMA, Parts | 5 | 5 | 5 |
| Flexural Strength, Kg/cm$^2$ | 60 | 196 | 215 |
| Flexural Modulus, Kg/cm$^2$ | 1,621 | 5,119 | 6,278 |
| Barcol Hardness | 18 | 33 | 38–44 |
| Impact Strength (ASTM D256) J/m | 55.00 | 58.74 | 78.50 |
| Oxygen Permeability, × PHEMA | 6.5 | 4.9 | 3.3 |
| Deflection (ASTM D790), mm | 12.3 | 9.3 | 9.5 |

EXAMPLE IX

To a round bottom polymerization flask, at room temperature, is charged 85.4 g of 1,1,3,3-tetramethyl-1,3, disila-2-oxacyclopentane, 3.1 g of 1,3-bis (4-methacryloxybutyl) tetramethyl disiloxane and 1.3 ml of trifluoromethane sulfonic acid. The reaction is mildly exothermic. The flask's contents are agitated on a shaker overnight. The reactants are neutralized with an excess of sodium bicarbonate, diluted with hexane and filtered to remove the carbonate. The hexane diluted product is then washed three times with water and dried over anhydrous MgSO$_4$. The hexane is removed at reduced pressure. By gel permeability chromatography, it is determined that the polyparaffinsiloxane has 75 ethylene disiloxane repeating units.

EXAMPLE X

A solution containing 70 parts of dicyclopentadienyl acrylate, 30 parts of the siloxane monomer of Example IX, 1 parts of hydroxyethylacrylate, 1 part of tertiary-butyl peroctoate and 2 parts of sec. butyl peroxydicarbonate is cast into film following the procedure of Example IV. The polymer is clear and suitable for optical use.

EXAMPLE XI

Example IX is repeated except that the ratio of disila-tetramethyloxacyclopentane to bis(methacryloxybutyl) tetramethyl disiloxane is 20:1. The resulting polyparaffinsiloxane monomer has 56 ethylene disiloxane repeating units.

EXAMPLE XII

A solution containing 60 parts of adamantanyl methacrylate, 40 parts of the siloxane prepolymer of Example XI, 1 part of hydroxyethylacrylate, 1 part of tertiary-butyl peroxydicarbonate and 2 parts of sec. butyl peroctoate is cast into film following the procedure of Example IV. The resulting polymer is clear and suitable for optical use.

The preceding examples and methods have been described in the foregoing specification for the purpose of illustration and not limitation. Other modifications and ramifications will naturally suggest themselves to those skilled in the art based on the disclosure. These are intended to be comprehended as within the scope of this invention.

The embodiments of the invention in which an exclusive property or privilege is claimed are defined as follows:

1. A shaped article suitable for use in biomedical applications being a polymer formed by polymerizing (a) one or more polysiloxane monomers $\alpha,\omega$ terminally bonded through divalent hydrocarbon groups to an activated unsaturated group with (b) a polycyclic modulus modifier and (c) a tear film stabilizer to form a crosslinked three-dimensional polymeric network, said modulus modifier being selected from the group consisting of isobornyl acrylate, isobornyl methacrylate, dicyclopentandienyl acrylate, dicyclopentadienyl methacrylate, adamantanyl acrylate, adamantanyl methacrylate, isopinocamphyl acrylate and isopinocamphyl methacrylate and is present in an amount from 90 to 30 parts per 10 to 70 parts of polysiloxane monomers and the sum of parts equals 100, said stabilizer being selected from the group consisting of hydroxyethylmethacrylate, hydroxyethylacrylate, hydroxypropylmethacrylate, hydroxypropylacrylate and mixtures thereof and is present in an amount from 2 to 20 parts per 100 parts of modulus modifier and polysiloxane monomers, said polymer having a flexural modulus of at least 1,500 Kg/cm$^2$.

2. The article according to claim 1 wherein from 90 to 40 parts of modifier are present.

3. The article according to claim 2 wherein the modifier is isobornyl methacrylate.

4. The article according to claim 1 wherein 3 to 12 parts of tear film stabilizer are employed.

5. The article according to claim 1 wherein from 5 to 9 parts of tear film stabilizer are present.

6. The article according to claim 1 wherein the tear film stabilizer is hydroxyethylmethacrylate.

7. The article according to claim 1 wherein an auxiliary modifier selected from the group consisting of tertiary-butyl acrylate, polyethylene glycol methacrylate, polyethylene glycol dimethacrylate, 1,3-bis (4-methacryloxybutyl) tetramethyl disiloxane, polyethylene glycol acrylate, polyethylene glycol diacrylate, divinyl benzene, divinyl alkyl benzene mixtures thereof is present in an amount of up to 20 parts by weight per 100 parts of modifier and polysiloxane.

8. The article according to claim 7 wherein from zero to 10 parts of auxiliary modifier are present per 100 parts of modifier and polysiloxane.

9. The article according to claim 1 wherein the polysiloxane is a poly(organosiloxane) of the formula

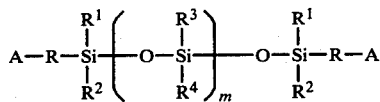

wherein A is an activated unsaturated group, R is a divalent hydrocarbon radical having from 1 to about 22 carbon atoms, $R^1$, $R^2$, $R^3$ and $R^4$ can be the same or different and each is a monovalent hydrocarbon radical or a halogen substituted monovalent hydrocarbon radical each having from 1 to about 12 carbon atoms and m is an integer from 0 to 100.

10. The article according to claim 9 wherein A is methacryloxy, R is a divalent hydrocarbon radical having from 1 to about 22 carbon atoms, $R^1$, $R^2$, $R^3$ and $R^4$ can be the same or different and are selected from the group consisting of a monovalent hydrocarbon radical or a halogen substituted monovalent hydrocarbon radical each having from 1 to 12 carbon atoms and m is an integer from 0 to 50.

11. The article according to claim 10 wherein R is an alkylene radical and $R^1$, $R^2$, $R^3$ and $R^4$ are each an alkyl radical having from 1 to 10 carbon atoms.

12. The article according to claim 11 wherein m is a number from 0 to about 25.

13. The article according to claim 1 wherein the polysiloxane is a polyparaffinsiloxane of the formula

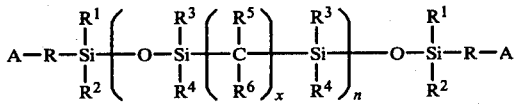

wherein A is an activated unsaturated group; R is a divalent hydrocarbon radical having from 1 to about 22 carbon atoms; $R^1$, $R^2$, $R^3$ and $R^4$ are each independently selected from the group consisting of a monovalent hydrocarbon radical having from 1 to about 12 carbon atoms and a halogen substituted monovalent hydrocarbon radical having from 1 to about 12 carbon atoms; $R^5$ and $R^6$ can be the same or different and are selected from the group consisting of hydrogen, a hydrocarbon radical containing from 1 to about 12 carbon atoms, a carboxylic acid group, carboxylic acid ester group represented by the formula $-C(O)OR^7$ wherein $R^7$ is selected from the group consisting of a hydrocarbon group containing from 1 to about 12 carbon atoms and a carboxylic acid amide represented by the formula $-C(O)NR^8R^9$ wherein $R^8$ and $R^9$ can be the same or different and each is selected from the group consisting of hydrogen and a hydrocarbon group containing from 1 to about 12 carbon atoms; x is 2 or greater and n is an integer of 1 to about 100.

14. The article according to claim 4 wherein R is an alkylene radical, $R^1$, $R^2$, $R^3$ and $R^4$ are each an alkyl radical having from 1 to 10 carbon atoms and $R^5$ and $R^6$ are each hydrogen or methyl and n is an integer from 1 to 50.

15. The article according to claim 14 wherein n is a number from 1 to about 25 and x is an integer from 2 to 10.

16. The article according to claim 15 wherein x is 2 or 3.

17. Wherein the article according to claim 1 is a gas permeable hard contact lens.

* * * * *